Dec. 26, 1967     E. W. SCHROEDER     3,360,775
ANTICOLLISION DEVICE AND METHOD

Filed Aug. 24, 1965     4 Sheets-Sheet 1

INVENTOR
EDWARD W. SCHROEDER

BY *Browne, Schuyler, & Beveridge*

ATTORNEYS.

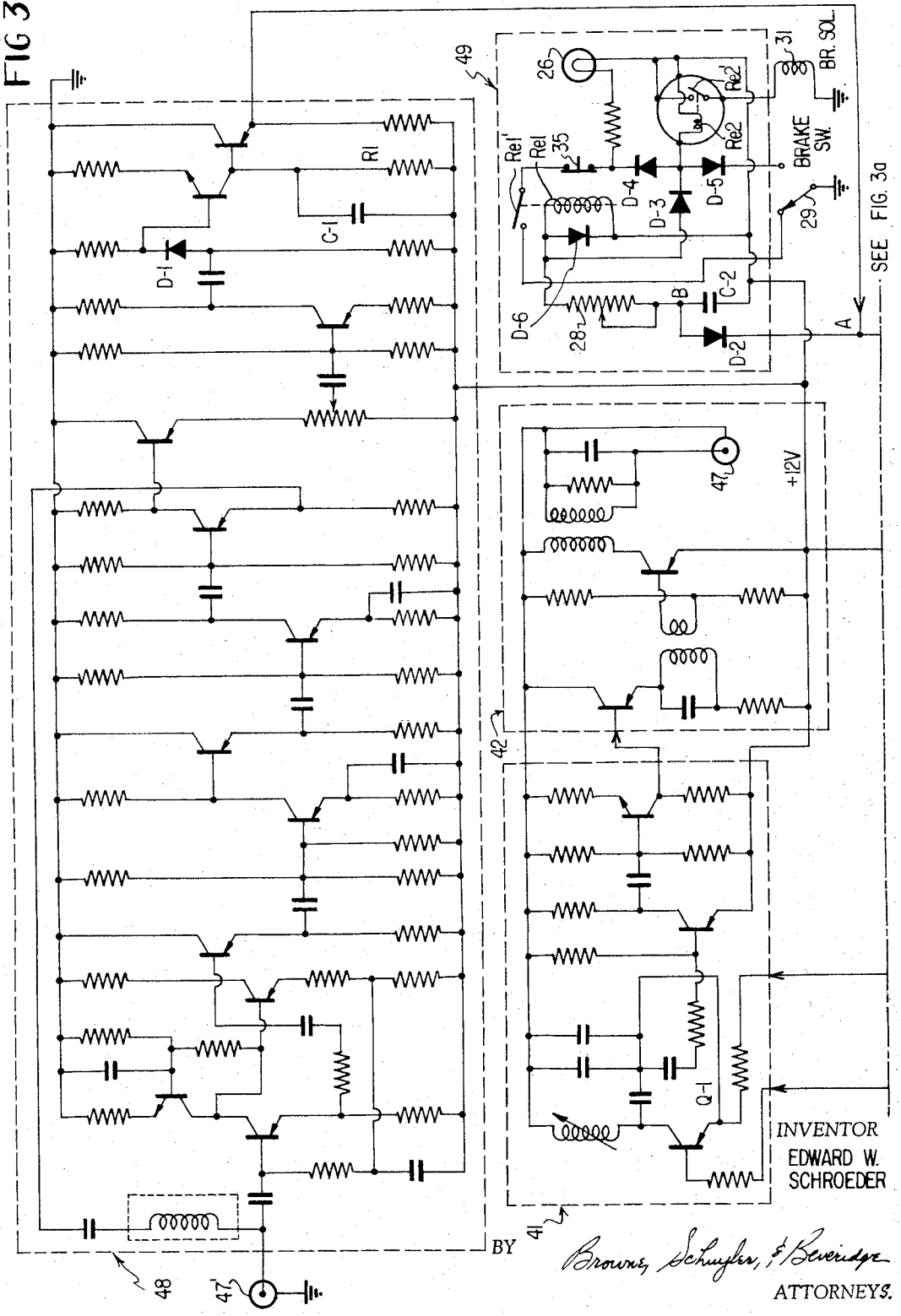

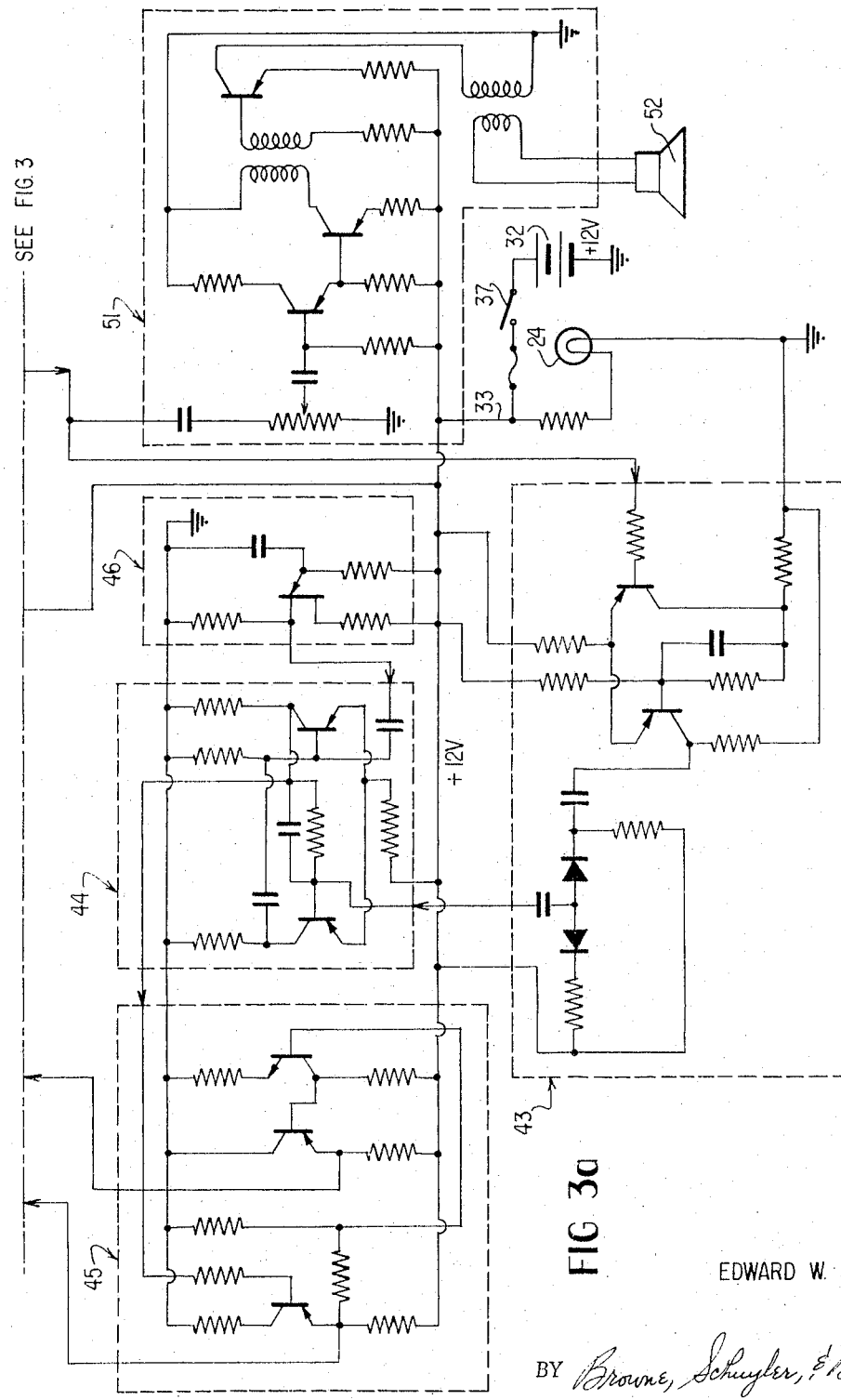

Dec. 26, 1967  E. W. SCHROEDER  3,360,775
ANTICOLLISION DEVICE AND METHOD
Filed Aug. 24, 1965  4 Sheets-Sheet 4
FIG. 4
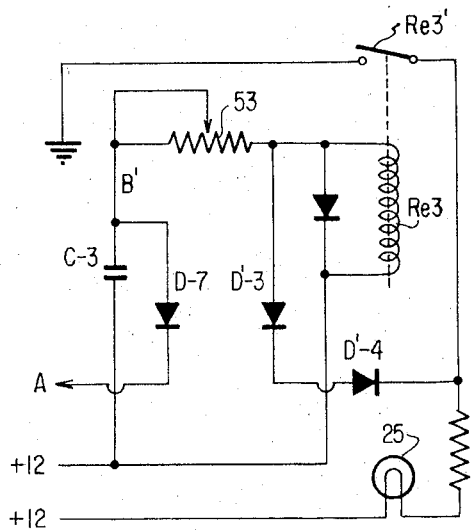
FIG. 4a
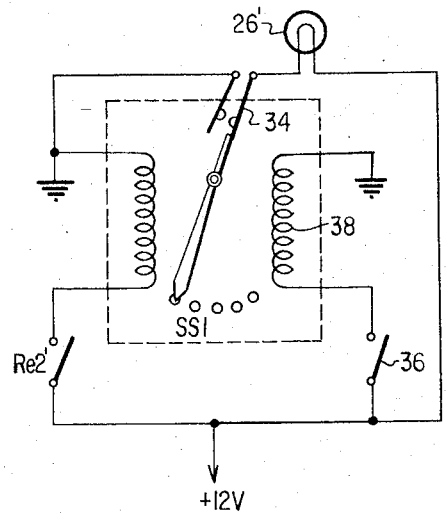
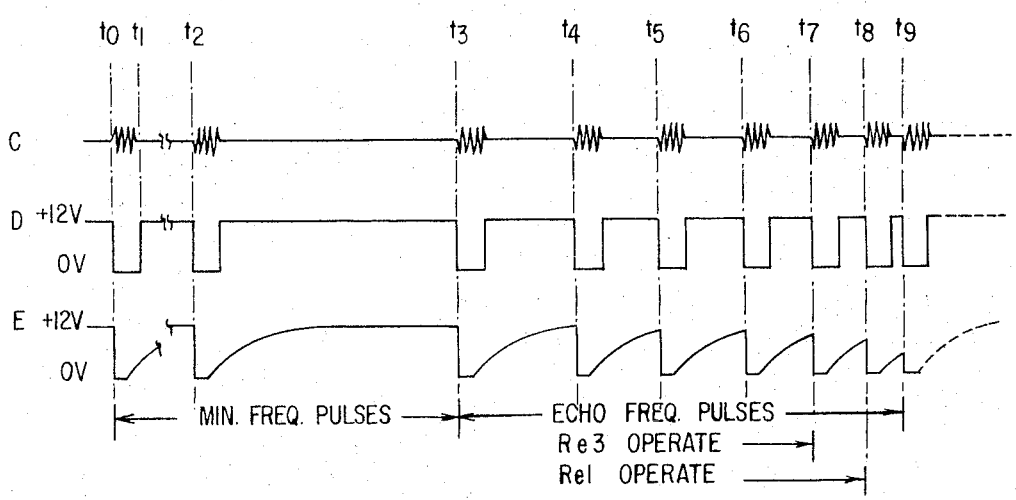
FIG. 5
INVENTOR
EDWARD W. SCHROEDER
BY Browne, Schuyler, & Beveridge
ATTORNEYS.

United States Patent Office 3,360,775
Patented Dec. 26, 1967

3,360,775
ANTICOLLISION DEVICE AND METHOD
Edward W. Schroeder, Atlanta, Ga., assignor to Marriott-Hot Shoppes, Inc., Washington, D.C., a corporation of Delaware
Filed Aug. 24, 1965, Ser. No. 482,119
15 Claims. (Cl. 340—32)

This invention relates generally to proximity indicators and more specifically to anticollision devices employed on moving vehicles to prevent accidental impact with nearby objects.

It has long been a problem to provide an automatic alarm system which has both a proximity alarm and the capability of automatically stopping a vehicle to prevent collision. This problem has particular importance at air fields where a service vehicle approaches an airplane and the point of closest approach may not be visible to the driver of the vehicle, and where minor impacts may cause expensive damage to the airplane. This problem is encountered with catering and servicing vehicles for such planes, in baggage handling equipment, and in military vehicles approaching bomb bays or the loading doors of a cargo plane. It has previously been suggested to provide a warning signal which depends upon the proximity of a moving object to a fixed object, which warning signal may give indication of the presence or rate of approach between vehicle and fixed object, or between two moving vehicles. To date, these arrangements have not generally been satisfactory for one reason or another and have not been readily adaptable for automatic stopping of a vehicle approaching impact with another object.

A desired feature in an anticollision device for use with catering trucks and service vehicles approaching parked aircraft is a means for continuously indicating closeness of approach as by providing a changing signal audible to the driver for indicating the distance remaining during the approach phase. Even with such a signal it is desired to provide automatic means for stopping the vehicle in the event the reactions of the driver are too slow, and to further provide a record of each use of the automatic stopping feature, to assist in training and safety evaluations for operations.

It is accordingly an object of this invention to provide an automatic distance gauging device which audibly indicates the nearness of approach of a vehicle to another object and visually indicates operation thereof.

Another object is to provide an actuating signal for application of brakes on a vehicle upon approach to another object within a forbidden range approaching collision.

A further object of the invention is to provide an audible signal which varies in pitch continuously within a predetermined region of close approach.

A still further object of the invention is to provide a sound ranging system operable in air to produce a plurality of warning signals upon approaching collision between two objects, one of which signals automatically records and terminates the approach, and another warns the operator of imminent operation of such automatic termination.

These and other objects of the invention will be apparent as the description proceeds in connection with the drawings in which:

FIG. 3 is a schematic wiring diagram of one embodiment of a system generally according to FIG. 2, continued at FIG. 3a.

FIG. 4 illustrates operation of a warning light in advance of brake setting;

FIG. 4a is a diagram of one mode of lockably registering operation of automatic braking; and FIG. 5 is a simplified diagrammatic showing of timing and waveforms of the embodiment of FIGS. 3–3a.

Figure 1:
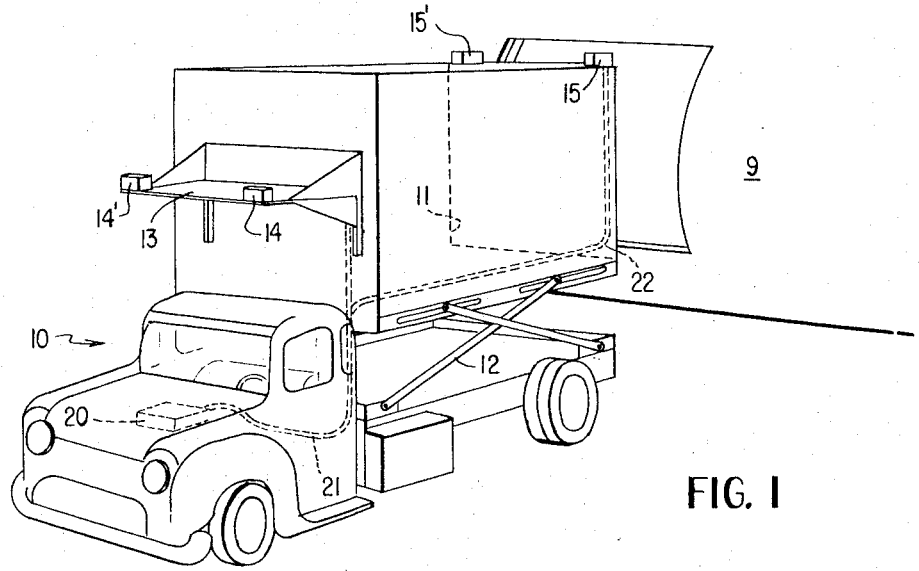
FIG. 1 is a perspective view of a vehicle having anticollision apparatus according to this invention.

Principal objects of the invention may be achieved in one example for a vehicle such as a catering truck, by placement at the corners of the vehicle, particularly at elevated positions likely to come in contact with the airplane, transmitter and sensor elements with which approach of the vehicle to any portion of the plane is detected. Transducer units may operate simultaneously from the same transmitter and receivers operate independently to produce echo signal suitably coordinated. A supersonic sound wave source connects to one or more transmitting transducers and is pulsed to issue a burst of waves which are reflected from any object in close proximity thereto and returned to a receiving transducer. This signal is processed to immediately initiate a new sound burst the timing of which is a measure of the distance remaining between the transmitter and the airplane. A suitable circuit converts this timing into an audible warning signal having a frequency inversely proportioned or related to the remaining distance, whereby the operator is warned of close approach to the airplane by a rapidly rising tone. A second portion of the return signal is used to automatically apply brakes to the moving vehicle when at a predetermined distance corresponding to a specified frequency of the developed audio signal.

Conversion of the supersonic signal to an audible signal is accomplished, according to the illustrated application of the principle using a short burst of transmitted supersonic waves, by receiving echoes of said waves, producing a single pulse for each echo, initiating therewith a new supersonic burst, receiving the echo of the new burst and generating therefrom an audio signal of changing frequency corresponding to the intervals between successively transmitted bursts, each burst being detected and incrementally stored as a D.C. voltage pulse. Successive pulses add serially to produce a varying frequency signal dependent upon the remaining distance between the vehicle and the object. The generated signal serves both as an audible distance indicator producing a visible warning and to actuate a brake mechanism at a specified remaining distance between vehicle and plane, which thereupon locks the brakes and prevents further approach of the vehicle to the plane until the locking mechanism is unlocked. The latter operation is suitably registered so that operator training may be monitored. In addition, warning lights indicate to the operator that (a) the system is in operation, (b) that he has approached within a region requiring reduction of speed, (c) a positive stopping point is reached requiring manual braking to avoid automatic setting of the anticollision brakes. Defeat of the anticollision braking and automatic signal registration is avoided by keying its operation to the ignition key of the vehicle, and by use of an automatic storage register resettable by a master key or by use of a recording relay or counter for indicating each near-collision.

Proceeding now to a more detailed description of the invention, it will be noted that an object 9 is approached by a vehicle 10 represented as a catering truck having body elevation sufficient for walk-in servicing of an airplane as at a rear opening 11, and that this vehicle optionally may be equipped with an elevator mechanism 12. Mechanism 12 may optionally be under control of the anticollison device either by providing an elevation turnoff switch therefor arranged in parallel with the brake actuating mechanism of the vehicle, or may be only operable before approach to the airplane, the anticollision device being operative for the positive prevention of collision either during forward or backward movement of the vehicle.

FIG. 1 illustrates such a truck having therearound a series of transmitter and receiver units arranged along each protruding corner of the vehicle, illustratively using one transmitter and receiver pair at each corner. While the present invention is illustrated as having separate transmit and receive transducers, it will be appreciated that a single transducer could be used for both purposes when provided with suitable circuitry for quenching transmitted pulses and distinguishing between the transmitted and received signals. The vehicle illustrated is representative of catering trucks, refueling vehicles, baggage elevators, bomb hoists, and of industrial vehicles not necessarily related to the approach of a servicing vehicle to an airplane, being equally applicable to approaches between moving vehicles and to automated operations in a manufacturing or assembly plant.

It will be noted that a control console 20 is adapted for mounting within the cab of a vehicle operated by a driver, as illustrated, but is readily adapted to automatic operation solely. Cables 21 and 22 connect console 20 to transducers at 14, 14', 15, 15'. Console 20 includes a speaker and signal lights 24, 25, 26 and 27, which may be remotely placed. Operate light 24 is preferably green and connects to the power supply for the warning system through the ignition key. A warning light 25 may be caused to operate at some predetermined distance of separation between the moving vehicle and the object, optionally equipped with a thermal flashing device, which provides a more vivid and compelling signal to the operator. In one example, this light is amber and is caused to flash at about one-half second intervals whenever the vehicles are within one to two feet of each other. This light could be operated directly from the frequency-sensitive circuit 49 forming part of the brake operating circuit, but is preferably operated at a time earlier than the setting of the brakes by a separate circuit controlled by a frequency discriminator later to be described. Desirably, the operator brings the vehicle to a complete stop upon observing light 25 prior to the time the brake setting mechanism comes into play. A separate relay and frequency responsive circuit is preferable to provide an operating mechanism for warning light 25.

Alternatively, the warning light may be operated from the audible signal by means of a vibrator, or the like, at a fixed frequency below that intended for the maximum signal at the time of the brake setting. The latter arrangement has the advantage that the audible signal and the visual signal are closely tied together, and the brake setting mechanism may then be coupled to both.

An additional light 26' (such as a white light) is actuated by the brake signal indicating that the brakes have been automatically set, by connecting in parallel with the brake-setting power contacts, but having a suitable lock-in relay arrangement suitable for keeping this light operated until such time as it may be reset at a control location, using a locking relay or back contacts, of a conventional stepping switch which requires a master-key-operated switch for resetting even though the brake setting is released as the brake setting circuit is opened, by manual button 35.

In addition to the impact warning visual signals there is preferably provided a malfunction light 27, illustratively red, which is operative whenever the ignition of the vehicle is turned on, or has power applied thereto, and indicates generally whether the system is operative by flashing at suitable intervals, such as one-half second, whenever a malfunction occurs in the system, as indicated in a suitably arranged test circuit.

When the vehicle is in operation and the operator has commenced his approach, the operating condition of the system is indicated by green light 24 (FIG. 2) which shows that the anticollision device is in operation, being illustratively connected between a fuse terminal at the power input from battery 32 to the transmitter and system ground, as illustrated in FIG. 3a. Upon observation of the green light, the operator may then determine by observing the red light whether the protective system is operative. Upon the vehicle approaching within a predetermined distance, such as 10 feet, whereat an echo signal actuates the audio frequency generator at a low frequency, the operator is appraised of his approach to another vehicle and the need to carefully control his speed. As he approaches his final stopping position, for instance within one or two feet, the amber light is operated to indicate that he should immediately stop, according to the preferred form wherein light 25 is actuated by a second frequency sensitive circuit or detector (FIG. 2) as by Re3 (FIG. 4). If he follows such a safety procedure and stops within the prescribed distance, the automatic brake setting does not occur and the white light indicating its operation is not actuated. Should he exceed the stopping distance because of too high an approach speed, or for other reasons, the automatic brake setting operation is initiated and the white light is operated. This light and the brakes remain operative so long as the vehicle is in this position and the ignition is turned on, unless reset button 35 is operated to disconnect the brake circuit as the vehicle is backed away from its near-collision position to the prescribed distance. In addition to operating the brake, a locking relay or suitable counting circuit is operated each time the brake setting relay is operated, to provide a retained indication that the vehicle was not stopped at the prescribed distance. Alternatively, the counting switch may be actuated by make-before-break contacts on reset button 35. This counting switch or locking relay is equipped with a reset circuit which is operative only upon the keyed operation of a lock, which key is retained by the supervisor at the control station for the catering service or at the central control station for the operations in which the vehicle may be used.

Automatic brake setting requires considerable power, for which power relays are provided. A pulsed DC signal from the frequency-responsive circuit, later to be described, is passed to signal relay Re1 and is sufficient to operate Re1 when the frequency reaches a set value. Attenuator 28 adjusts the frequency at which relay Re1 operates to close contacts Re1', thereby locking in the brake circuit. When the vehicle is to be moved away from the object, normally closed reset button 35 is actuated to break the circuit. If the automatic distance measuring circuit is turned off by turning off the ignition key and the key is again turned on, the brakes are again locked. An alternative brake lock is provided for manual operation by switch 29 which is settable either for manual lock independently of the ignition switch or for automatic operation.

Re2 is provided to increase power handling capacity as by connecting its operating coil via diode D-3 between attenuator 28 and the D.C. voltage supply. As the output voltage of the frequency sensitive circuit changes upon rising frequency to a set value (such as 4 kc. corresponding to perhaps 4" separation between vehicle and object) this voltage appears across the coil of Re1 and closes contacts Re1' to operate Re2 through D-4 and apply direct power to the brake solenoid contacts 31 by way of Re2', for either position of switch 29. Diodes D-3, D-4 and D-5 are suitably connected to Re2 and poled to permit alternative operation thereof as described.

Proceeding now to a description of the means by which the audible signal is produced and by which the brake setting operation signal is provided, reference is made to FIGS. 3-3a to illustrate an appropriate electrical system, including a supersonic signal generator 41, transmitter 42, pulsing trigger circuitry 43 for gating the signal generator for predetermined short intervals, wave shaper multivibrator 44, switch or impedance matcher 45, and minimum frequency pulse timer 46, optionally including a unijunction transistor in an RC circuit to provide at least one pulse during each interval such as one-half second, all connected to control an oscillator for generating a suitable supersonic wave, such as 40 kilocycles, adapted to efficiently operate the transducer 47 by way of transmitter 42.

Suitably adjusted, the transmitter circuit provides a sufficient number of cycles of the supersonic frequency to assure a reliable transmitted signal, or burst, after which the transmission terminates. A switching transistor is connected in an RC circuit to pulse about twice each second and to initiate transmitted signals about twice each second when no echoes are received to initiate bursts at a more rapid rate. A minimum frequency of pulsing for the transmitter may be established thereby at one input to multivibrator 44, a second input thereto being connected to trigger circuit 43, operated in response to each received echo, either input being equally effective to produce the desired burst of transmitted frequency for probing for nearby objects.

Figure 2:
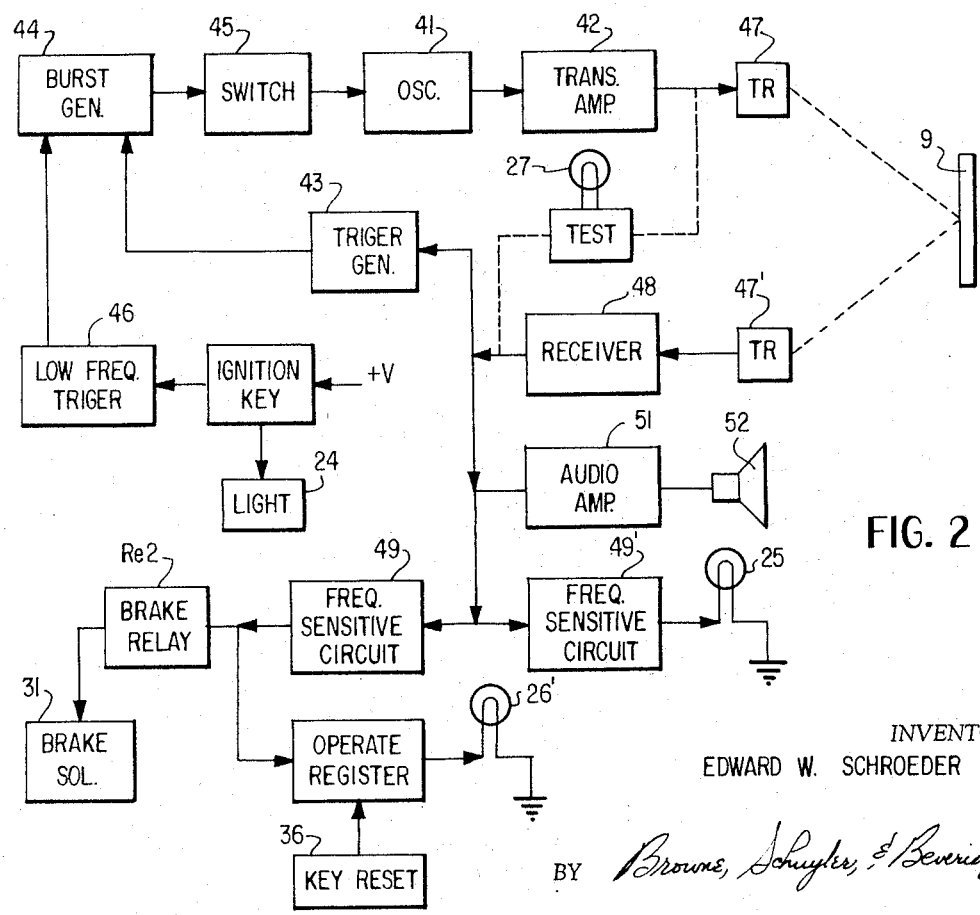
FIG. 2 is a block diagram of an electrical system for carrying out the invention.

An understanding of the circuit may be had by reference to FIG. 2 showing in block diagram the functional elements of the system, and then to FIG. 3 wherein suitable circuit components are interconnected to provide the functions shown in FIG. 2. A battery 32, illustratively grounded at the negative side, is connected to a power supply bus 33 as by ignition switch 37. Primarily, output of the circuit as a whole provides a positive voltage connection from battery 32 by way of switch 37, bus 33 and relay Re2' contacts to the brake solenoid 31 to set the brakes.

The transmitter includes a basic oscillator 41 producing a supersonic signal. Output from oscillator 41 is taken to transmitter amplifier 42, suitably connected also to bus 33 for production of a suitable voltage for operating a transducer.

Echo trigger generator 43 is connected to point A at which a signal is developed having a frequency inversely proportional to the remaining distance between the transducer and the object being approached. Each pulse occurring at point A actuates trigger generator 43 which serves as a gate to operate multivibrator 44 from its normal state to its open gate condition, and the output of multivibrator 44 is taken to the impedance matching circuit 45 which may be constructed according to various well known plans. Circuit 45 may include an amplifier and may serve principally as a switch for supplying one or more keying voltages to the oscillator 41 for initiating a burst and terminating that burst after a suitable interval, generally one-half millisecond or less. It is characteristic of the oscillator that it produce no output signal except when switch 45 responds to the gating pulse generator 44 for the duration of a single burst to be transmitted.

Transducers of various types may be employed for projecting the output signal from the amplifier 42 and for receiving back the echo from any object to which the vehicle is approaching. Illustratively, a transducer 47 may be of the magnetostrictive type separate from the transducer 47' placed in the vicinity thereof for receiving back the desired echo. Suitable gating circuits are also well known in the art for connecting together the transmitter and the receiver to the same transducer in which the transmitted pulse is prevented from operating the receiver circuit then gated to an "OFF" condition during the interval of the gate signal from gating circuit 44. While the transducer has been noted as comprising a magnetostrictive energy converter, it could be a crystal transducer of conventional type operating within its design frequency mode.

Minor modifications of circuitry would permit the employment of a capacity device in which the outgoing signal charged one plate of a capacitor of which the other plate constituted the conductive object being approached. It is accordingly not intended that this invention be limited to a particular form of transducer or to particular circuitry for detecting the presence of an object at positions near collision so long as sensitivity is increased at positions close to collision, as would generally be present in ultrasonic frequency transmitter, and the circuitry is suitable for the production of a signal output the frequency of which rises as approach is made.

Transducer 47' is conveniently connected to receiver 48 having high gain amplification at the frequency of the oscillator 41 and having means therein for detecting from the returned supersonic frequency a D.C. or a low frequency A.C. signal corresponding to the frequency of transmission of energy bursts. Conveniently, this may be done by the employment of a diode D–1 illustrated in receiver 48 as passing a positive signal via a transistor of the NPN type having the collector connected to the positive voltage supply by way of resistor R–1 and parallel capacitor C–1 and having the emitter thereof connected by way of a load resistor to system ground. Resistor R–1 and capacitor C–1 form a circuit integrating the individual supersonic signal excursions of one sign stored on capacitor C–1 with a time constant such that voltage output at point A is a series of pulses each of which corresponds to a single burst of supersonic energy to be received by echo from the detected object. A series of such pulses may be taken as negative or positive, depending upon the coupling circuit here illustratively taken at point A as decreases in voltage from the 12 volt supply voltage on bus 33, having durations closely approximately the trigger pulse at generator 44.

A frequency sensitive circuit shown in block 49 includes a further storage capacitor C–2 having one side connected to the positive voltage and the other side B connected to the anode of diode D–2 which has the negative terminal thereof connected at point A to receive the pulses generated in receiver 48. Circuit 49 further includes attenuator 28 by which the voltage output from the circuit including C–2 and D–2 is passed on to relay Re1. Attenuator 28 may also control rate of storage of the signal on capacitor C–2, usually in conjunction with a further resistor element according to well known practice, illustratively including a resistor in the coupling circuit at the output of receiver 48.

The time constant for the circuit including C–2 and D–2 is arranged such that current through attenuator 28 is insufficient to operate the coil of Re1 at the basic frequency of trigger 46. Whenever a signal is received back from a nearby object of sufficient strength to operate the receiver, pulses occurring at point A are of higher frequency than the basic pulsing frequency. At a particular distance current through Re1 is such that contacts Re1' are operated. A locking circuit is established through normally closed P.B. 35 and switch 29. Re2 is operated through diode D–4 rather than D–3 which keeps Re2 operated.

As previously noted, the brakes are controlled through the contacts Re2' for automatic stopping of the moving vehicle. It will be appreciated that other contact arrangements may be associated with Re2 such as to provide automatic turn-off of power when vehicle power is supplied for moving the vehicle through, or under control of, normally closed contacts on Re2.

Once Re2 has operated and the hold circuit has been made effective, it may be interrupted only by operation of the reset switch 35 or by the ignition key. As illustrated, whenever the signal relay Re1 is operated, Re2 is grounded on one side by way of D–4 or D–5. A warning signal light 25, previously described as amber, or light 26, may be connected between the voltage bus 33 and the ground connection through suitable connection to the cathode of D–4. An alternative arrangement, illustrated in FIG. 4, provides an additional advantage in that the light 25 may be made to operate at a time earlier than the setting of the brakes through relay Re2. Additionally, it may be desirable that light 25 be operated and continued in operation. For these purposes operation of light 25 is provided in accordance with FIG. 4 in which a signal storage capacitor C–3 is connected to the signal source at A through a diode D–7 and to B' in the same manner as C–2 is connected through diode D–2 to the output of receiver 48. Relay Re3 having contacts Re3' is suitably connected to the junction of C–3 and D–7 through a suitable attenuator 53 which is adjustable to provide operation of Re3, preferably at a frequency output from receiver 48 below that for which Re1 is set to operate. Thus, Re3 may be caused to operate as the vehicle approaches within one or two feet of an ultimate stopping position to energize lamp 25.

In place of operating light 26 in parallel with Re2, extinguished by reset button 35, a stepping switch such as SS1 may be connected as in FIG. 4a with its operate coil connected between the cathode of D–4 and the positive voltage supply or in parallel with solenoid 31, as illustrated. Such a switch conventionally has a reset coil operative under control of a separate switch which releases any ratcheted advancement of the switch from its zero or normal position. This reset coil 38 may suitably be connected under control of a key locked switch 36 whereby a supervisor may employ his master key for resetting SS1 merely by inserting and operating a key as in the manner of an ignition key. Back contacts 34 associated with the wiper arm of SS1 connect light 26' between the power bus 33 and ground so as to maintain the warning light in operation from the moment the frequency is reached for which attenuator is set and until SS1 has been reset by the supervisor. Equivalently, a reset multivibrator may be placed in analogous position to SS1 such that one stable position leaves light 26' connected thereto inoperative and the other stable position leaves light 26' operated. Resetting is accomplished through switch 36 as in the case of SS1 by operation of the supervisor's key as schematically illustrated in FIG. 4a. Thus an operate register is actuated which may be reset only upon operation of the key locked reset switch even though the ignition key be turned off or power otherwise interrupted momentarily, such as to deactivate circuits such as relays with lock-in contacts.

FIG. 5 illustrates typical waveforms of transmitted bursts, wherein the bursts are relatively much longer than in practice. At $t_0$ the ignition key is operated and a burst extends for perhaps .0005 second to $t_1$. At $t_2$ (e.g., +½ sec.) a second minimum frequency trigger occurs, and another at $t_3$. At $t_4$ an echo causes a shorter interval as the trigger circuit 43 operates, this occurring more often until at $t_7$ Re3 operates to cause warning light 25 to operate. At $t_8$ Re1 operates to effect automatic brake setting and to lock in light 26 or 26'.

Curve D of FIG. 5 represents a typical waveform at A, and curve E an output at B or B' corresponding to initial turn-on, approach, echo-governed intervals $t_3$–$t_4$, $t_4$–$t_5$, etc., and development of operating average signals at $t_7$, $t_8$ and $t_9$.

As applied to a catering or servicing vehicle for airplanes, this invention provides an indicator of the presence of any portion of the plane in the path of the vehicle. A number of sensors may be employed, individually operative to detect near approach by any portion of the vehicle each separately directed, or the one indicating nearest approach may be made to assume immediate control through suitable logic circuitry. An audible signal is produced only when an echo is received from a location close enough that successive bursts occur at an audible frequency, which frequency rises rapidly during approach, especially at near-collision distances. A first audible warning may thus occur at ten feet or more and the remaining distance is thereafter continuously measured and indicated by the pitch of the audible frequency, preferably being at 4000 to 8000 c.p.s. at the time of automatic stopping. The audible signal thus is a continuous and complete indicator of distance between transducers and plane.

An operate light indicates system operation; a warning light indicates imminent auto-braking; a brake set light indicates usually the near-collision point, and may be retained even upon removal of vehicle from near-collision as a monitor signal with anti-defeat protection by coupling through the ignition and a locked switch; and the automatic brake setting at a selected protective distance may optionally be applied as a power turn-off control for the vehicle in addition to, or in lieu of, the braking action. Provision for backing off is made by an automatic braking defeat button without cancelling the registered actuation thereof. This latter feature is useful for automated operations as well as for safety training of drivers for service vehicles.

While the invention has been described with reference to an exemplary embodiment, it will be understood that other equivalent structures and modes of operation are intended to be included within the spirit and scope of the appended claims.

What is claimed is:
1. The method of controlling the approach of a moving vehicle to a reflective object which comprises:
   generating a series of limited duration bursts of energy at a supersonic frequency,
   projecting said energy in the direction of approach,
   receiving reflections of successive bursts from said object,
   projecting a further said burst immediately upon receipt of the first said reflection after each previous burst,
   storing said received reflections in a signal form whereof the stored magnitude varies inversely with the distance between vehicle and object,
   utilizing the stored magnitude of signal to limit the approach of the vehicle to the object,
   generating from said received reflections an audio warning signal varying with the reciprocal of the remaining distance, and
   utilizing said audio signal to actuate a control signal at a selected frequency limit.

2. A vehicle movement control device operative in conjunction with supply of power to the vehicle, comprising:
   means projecting from the vehicle in the direction of travel thereof an oscillatory signal of a first frequency for a limited burst duration,
   means triggering repeated said signals at a second frequency defining a predetermined maximum interval between signal bursts,
   means receiving a projected signal reflected from a nearby object during a said interval,
   means triggering a further said signal burst in response to receipt during any said interval of a reflected signal burst,
   means converting received bursts of said first frequency to single pulses,
   means converting serially converted pulses to an audible signal of a third frequency variable according to distance of signal travel between said vehicle and object thereof, and
   means responsive to signals of said third frequency for stopping the vehicle at a value corresponding to an established limit distance.

3. A device according to claim 2 including means responsive to increase in said third frequency to a set value thereof for applying a braking signal.

4. A device according to claim 2 including means responsive to increase in said third frequency to a set value thereof for operating a warning light.

5. A device according to claim 2 including means responsive to increase in said third frequency to a first set frequency for operating a warning light, and means responsive to increase in said third frequency to a second set frequency for applying a braking signal.

6. A device according to claim 2 including means registering operation of said stopping means.

7. A device according to claim 6 further including means preventing erasure of each registered operation except upon keyed operation of a lock.

8. A device according to claim 6 including means operative to count successive operations of the stopping means, and keyed switch means for resetting said counting means.

9. In a vehicle anticollision device for signaling the approach of a moving vehicle to an object, means projecting from the vehicle a signal burst of supersonic waves of predetermined duration, means causing said signal burst to be repeated at least once in each successive period comprising a maximum interval of probing, means receiving and amplifying a reflection of said waves during said interval, means repeatably operative upon receipt of a said reflection to initiate a further said signal burst before the termination of a said interval concurrent therewith for causing successive said bursts to occur at a frequency variable with the travel time of said signal burst between said projecting and receiving means, and means utilizing successively received burst reflections to generate a signal of frequency inversely proportional to said travel time.

10. In a device according to claim 9, means for generating a control signal rising in magnitude with said frequency, and means responsive to a selected said signal magnitude for terminating the motion of the vehicle.

11. In a device according to claim 9, means responsive to the frequency of initiation of signal bursts for actuating an alarm signal when said frequency reaches a preset value.

12. In a device according to claim 9, means responsive to a first said frequency of received bursts for terminating the motion of the vehicle, and means responsive to a second said frequency of bursts for actuating a warning signal.

13. In a device according to claim 9, means presenting the generated signal of burst frequency as an audible indicator of distance to collision rising in pitch within the range of low frequency to high frequency sound as said distance decreases substantially in the range of ten feet to one-third foot.

14. A vehicle motion control device, comprising:

means transmitting an oscillatory signal from exposed portions of said vehicle for an interval not substantially exceeding one-half millisecond, means repeating said signal not substantially less often than twice each second, means receiving reflections of said signal from objects in the path theerof, means generating a single voltage pulse for each interval of transmission, means transmitting a further said signal upon the generation of each said pulse, means cimulatively storing said pulses as a voltage dependent on the frequency thereof, means responsive to stored voltage for actuating a vehicle motion control at a selected voltage value, and means producing from successively generated said pulses an audio tone whereof the pitch is inversely proportioned to the remaining distance between vehicle and object, 15. A device according to claim 14 including:

means for registration of each operation of said vehicle control, and means retaining an indication of said registration when said control has been deactivated.

No references cited.

THOMAS B. HABECKER, *Primary Examiner.*